FIG. I

United States Patent Office 3,836,547
Patented Sept. 17, 1974

3,836,547
NITRATION OF ANTHRAQUINONE
Istvan Toth, Bottmingen, Basel-Land, Switzerland,
assignor to Sandoz Ltd., Basel, Switzerland
Filed June 7, 1972, Ser. No. 260,427
Claims priority, application Switzerland, June 10, 1971,
8,413/71; Oct. 5, 1971, 14,587/71; Oct. 20, 1971,
15,352/71
Int. Cl. C09b 1/00
U.S. Cl. 260—369                                    10 Claims

ABSTRACT OF THE DISCLOSURE

Disclosed is a nitration process carried out in concentrated nitric acid and in which the rate of reaction of the nitration process is reduced by the addition of an inhibitor, the inhibitor having a basicity greater than that of the $NO_3^\ominus$ ion and being stable under the reaction conditions, e.g. being the nitrite or phosphate ion. The process is useful in the partial nitration of compounds having a plurality of sites susceptible to nitration, being particularly useful in the production of 1-nitro-anthraquinone from anthraquinone.

---

Figure 1:
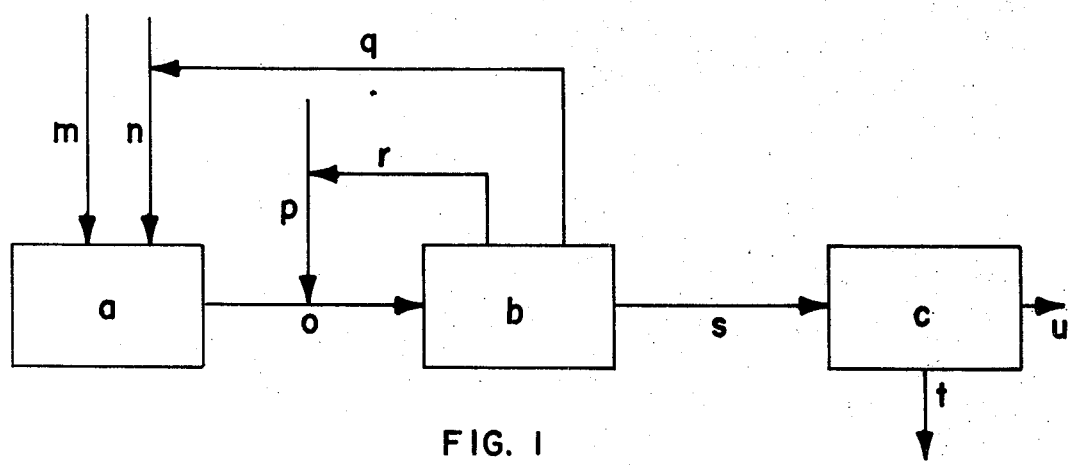

The invention relates to nitration processes.

In the nitration of compounds having a plurality of sites susceptible to nitration, using an excess of concentrated nitric acid, a mixture of variously nitrated products is almost invariably obtained unless, of course, it is desired to obtain an exhaustively nitrated product when the conditions and length of reaction can generally be so chosen as to ensure nitration at all sites. The difficulty arises when it is desired to obtain a particular product in reasonable yield and purity in which not all the susceptible sites have been nitrated, e.g. when it is desired to obtain a mononitrated product. One method employed to obtain such a product is to dilute the nitric acid with water after the desired degree of nitration has taken place and thereby douse the reaction and prevent further nitration taking place. This, however, results in the nitric acid being diluted, and the regeneration of concentrated nitric acid from the dilute acid can be difficult or uneconomical.

The present invention is based on the discovery of certain nitration inhibitors which can be used to reduce the rate of nitration reactions and thereby obviate the need to douse the reaction with water.

Thus, the present invention provides a nitration process in which nitration is carried out using concentrated nitric acid, characterised in that, after commencement of and during nitration, the rate of reaction is reduced by the addition of a nitration inhibitor, said inhibitor being an entity having a basicity greater than that of the $NO_3^\ominus$ ion and being stable under the reaction conditions.

Examples of such nitration inhibitors are inorganic anions which are stronger bases than the $NO_3^\ominus$ ion and which are stable under the reaction conditions, such as phosphate ions and nitrite ions, phosphate ions being preferred. The phosphate ions may be added, for example, in the form of phosphoric acid or as soluble phosphates. The nitrite ions may be added, for example, in the form of soluble nitrites or as $N_2O_3$.

In the process of the invention, the concentration of the nitric acid is preferably greater than 90%, but preferably less than 100% since the presence of small amounts of water promotes the efficacy of the inhibitor. Thus, the water content of the reaction mixture is preferably of the order of 3 to 10%.

The inhibitor is added to the reaction mixture after the desired reaction time in quantities sufficient to reduce the rate of reaction the desired amount. In the case of nitrite ions it is advantageous not to add more than 10% (calculated as $N_2O_3$) by weight based on the weight of nitric acid while in the case of phosphate ions larger amounts, e.g. up to 400% (calculated as $H_3PO_4$) by weight based on the weight of nitric acid, may be added. The addition of smaller amounts of phosphate, e.g. of the order of 10% (calculated as $H_3PO_4$) decelerates the rate of reaction to a greater or lesser extent depending on the amount of inhibitor used, whereas greater amounts of phosphate, for example from 50% to 400% (calculated as $H_3PO_4$) slows down the rate of reaction to such an extent that, after addition thereof, the reaction can be considered as suspended.

The process of the invention permits the rate of nitration to be varied at any point in the reaction period by addition of inhibitor in the amount and/or rate required to decelerate the rate of reaction or to stop the reaction, whichever is required. Having decelerated the rate of reaction, it is possible, by the addition to the reaction mixture of further concentrated nitric acid, e.g. fuming nitric acid, to accelerate the rate of reaction again, if desired.

With the presence of sufficient inhibitor in the reaction mixture, no further or no significant further nitration takes place even at the distilling temperature of the nitric acid. The nitric acid can be regenerated in economical fashion, for example by distillation at reduced pressure or using rapid evaporators. If nitrites are used as inhibitor sources, the distillate can be separated into various fractions from which nitric acid fractions of high and low inhibitor content can be recovered and re-used, the low inhibitor content acid being used, for example, for nitrating further starting material, and the high inhibitor content acid being used to reduce the rate of reaction. The number and composition of the fractions varies with the nature and amount of the inhibitor used. If the inhibitor source is more highly volatile than $HNO_3$, for example if it is $N_2O_3$, at least two fractions are distilled: a prefraction of high inhibitor content and a main fraction consisting essentially of highly concentrated nitric acid. The residue contains the more dilute nitric acid and the nitration product. If the inhibitor source is less volatile than $HNO_3$, for example if it is $H_3PO_4$, it is preferable to distill only one fraction consisting essentially of highly concentrated nitric acid. The residue then contains the more dilute nitric acid, the inhibitor and the nitration products. The nitration product if solid and present in suspension in the residue can be separated from the mother lye by mechanical means. The mother lye can then be used again, if necessary after regeneration and/ or the addition of further acid.

The process of the invention is particularly suitable for the production of nitrated products which are solid and insoluble or sparingly soluble in the reaction mixture, the process being particularly applicable in the nitration of anthraquinone to 1-nitroanthraquinone. In the production of 1-nitroanthraquinone, the inhibitor is preferably added to the reaction mixture after the reaction is 50% to 97% complete.

Figure 2:
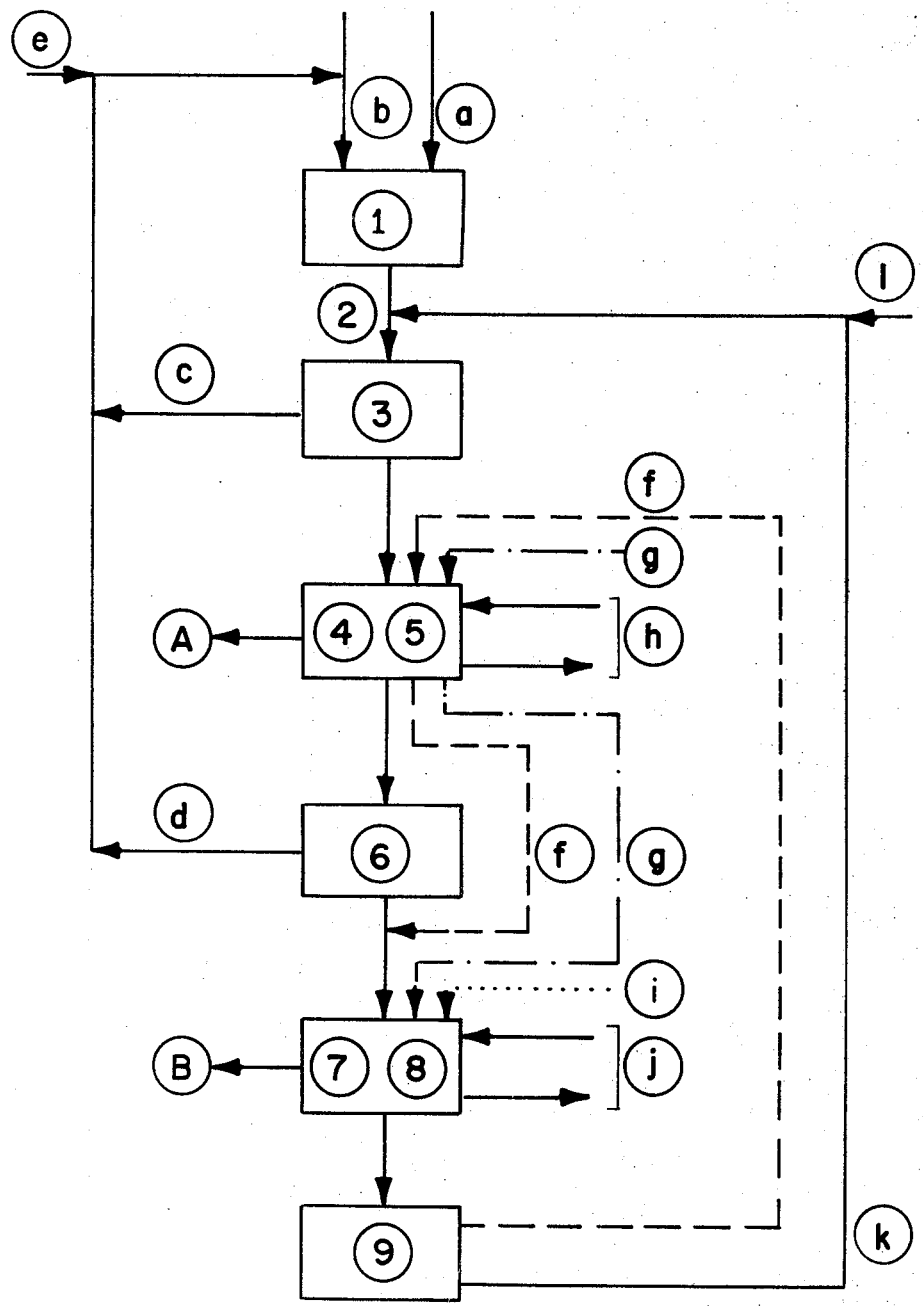

Two particular embodiments of the invention, illustrating procedures for the regeneration and re-use of the concentrated nitric acid and inhibitor, will now be described with reference to the accompanying drawings in which, FIG. 1 is a flow sheet of a first embodiment, and
FIG. 2 is a flow sheet of a second embodiment.

Referring now to FIG. 1 of the drawings; (a) is a reaction unit which may, for example, be a reaction cascade or reaction tube, (b) is a rectification or distillation unit, and (c) is a separation unit which may, for example, be a centrifuge and/or evaporator.

Starting material, for example anthraquinone, and concentrated nitric acid are fed into the reaction unit (a) through (m) and (n) respectively. After a predetermined reaction period, determined, for example, by the length and flow rate of the reactants through the reaction unit (a) when such is a reaction tube or cascade, the reaction mixture is led vio (o) to the rectification or distillation unit (b). At a point intermediate (a) and (b), inhibitor, for example sodium nitrite, is admixed with the reaction mixture, being introduced through (p). Upon admixture the rate of the nitration reaction is reduced. The mixture of concentrated nitric acid, final nitrated product and inhibitor then passes to unit (b). In unit (b) the mixture is distilled to obtain two nitric acid fractions, one of relatively high inhibitor content and one of relatively low inhibitor content, and a sump fraction (residue) containing the nitrated product. The nitric acid fraction of low inhibitor content is passed via (q) to (n) and thence into reaction unit (a) to nitrate further starting material introduced through (m). The nitric acid fraction of high inhibitor content is passed via (r) into (p) and thence into the nitration reaction mixture as it is led from (a) to (b). The sump fraction is led via (s) into the separation unit (c) where the solid nitrated product, for example 1-nitroanthraquinone, is separated from the remainder of the residue by centrifuge, the nitrated product then being led away via (t), for example for further purification if necessary, the remainder of the residue being led away via (u), for example for further rectification.

Referring now to FIG. 2 of the drawings, starting material (a), e.g. anthraquinone, and concentrated nitric acid (b) are led to and mixed in the nitration device (1) where they are allowed to react. When the starting material has reached the desired degree of nitration, the reaction mixture is run into concentrated phosphoric acid (k), previously added in 2. In 3, concentrated nitric acid (c) is distilled from the mixture. This causes solid nitration product (1-nitroanthraquinone) to settle out in crystalline form. The crystalline product (A) is filtered off in 4, washed in 5 with dilute nitric acid (f), then with hot water (g), and finally with further hot water (h) for neutralization, which involves the loss of a small amount of phosphoric acid. The filtrate from 4 is distilled in 6, from which concentrated nitric acid (d) is obtained and further crystalline product settles out. The crystalline product is filtered in 7 together with (f), washed in 8 with (g) and then with hot water (i) and finally neutralized by washing with excess hot water (j). The product (B) is obtained at this stage. The filtrates are jointly regenerated in 9, with simultaneous distillation of dilute nitric acid (f) leaving concentrated phosphoric acid (k). The concentrated phosphoric acid (k), if necessary after enrichment with further phosphoric acid (l), is recycled to 2. The dilute nitric acid (f) is recycled to 5. The concentrated nitric acids (c) and (b), if necessary after the addition of supplementary nitric acid (e), are recycled to 1. In the aforestated distillations it is of advantage to work at reduced pressure.

Nitration according to this operating system can be carried out fully continuously, discontinuously or semicontinuously. For instance, nitration can be carried out discontinuously and the nitration mixture worked up continuously.

The crude 1-nitroanthraquinone produced in accordance with this invention can be worked up to pure 1-nitroanthraquinone and by-products, or it can be used directly, for example for reduction.

The invention is illustrated by the following Examples in which the parts and percentages are by weight and the temperatures in degrees centigrade.

EXAMPLE I 50 parts of ground anthraquinone are added to 600 parts of 98.3% nitric acid which contains 0.32% $N_2O_3$ and the mixture is cooled to —1°. The reaction is allowed to continue for 8 minutes with stirring, during which time the temperature increases to 18.5°. At this point, a solution of 6.5 parts of sodium nitrite in 15 parts of water is added dropwise over a period of 1 minute. This addition brings the nitration reaction to an end. The temperature increases further to 35°. The reaction mixture is held at temperature of 33–35° using an oil bath, and distillation is effected at a pressure decreasing from 150 to 50 mm. Hg. The following fractions are obtained:

top fraction: 55 parts of 103.7% nitric acid containing 4.4% $N_2O_3$;
main fraction: 350 parts of 99% nitric acid containing 0.04% $N_2O_3$.
cooling trap: 35 parts of 97% nitric acid containing 0.14% $N_2O_3$;
sump fraction (residue) after filtration of the solid anthraquinone mixture: 104 parts of a solution composed of 74.7% $HNO_3$, 0.7% $N_2O_3$, 17.5% $H_2O$ and 7% of a mixture consisting of one-third 1-nitroanthraquinone, one-third anthraquinone and one-third of other nitration products.

The solid nitroanthraquinone mixture filtered from the sump (residue) consists of 50 parts of 1-nitroanthraquinone of 90% purity.

EXAMPLE 2

Referring to FIG. 2 of the drawings; in a reaction vessel 1, 100 parts of anthraquinone (a) are added to 1200 parts of 98% nitric acid of 0.3% $N_2O_3$ content (b). Nitration is allowed to proceed adiabatically for 10 minutes at temperatures increasing from 0° to 21°. The nitration mixture is then poured rapidly into 1200 parts of 95% phosphoric acid 2 at room temperature. This terminates nitration completely and causes the temperature to increase by about 10°. The mixture is conveyed into 3, where distillation is carried out at 100 to 80 mm. Hg pressure, 40 to 65° internal temperature and 29 to 48° boiling temperature. 950 parts of 100% nitric acid (c) are distilled off, while the nitration product settles out as crystals.

The crystalline product is filtered off in 4, at about 65° and the filtrate directed on to 6. The crystals are washed in 5, first with dilute (about 20–40%) nitric acid (f), then with 100 to 150 parts of hot water (g) and finally with about 500 parts of hot water (h) until completely neutral.

This operating procedure results in approximately 120 parts of moist product A, which is equivalent to about 97 parts in the dry state. Analysis shows product A to consist of 24% anthraquinone, 72% 1-nitroanthraquinone, 2% dinitroanthraquinones and 1% 2-nitroanthraquinone.

The filtrate in 4 is distilled in 6 at 60 mm. Hg pressure at an internal temperature of 50 to 80° and a boiling temperature of 25 to 50°; about 150 parts of 98% nitric acid (d) are distilled off, while the nitration by-product (a mixture of anthraquinone, α-, β- and dinitroanthraquinones) settles out as crystals. The wash water (f) containing nitric acid and phosphoric acid is added to this mixture over a period of about 5 minutes, causing additional precipitation. The separation step is carried out in 7 in the same way as in 4. The filter residue is washed in 8, first with the wash liquid (g), then with 50 parts of water (i) and finally with about 500 parts of water (j) for neutralization. Approximately 90 parts of moist product (B) are obtained, which is equivalent to 17 parts of (B) in the dry state. Analysis shows it to contain 28% anthraquinone, 26% 1-nitroanthraquinone, 35% 2-nitroanthraquinone and 8% dinitroanthraquinone. The filtrates from 7, (8g) and (8i) are combined and regenerated in 9 at 50 to 30 mm. Hg pressure and temperatures from 70 to 130°. Amounts of 150 to 200 parts of about 20 to 40% nitric acid (f) are distilled off, leaving 1125 parts of 95–97% phosphoric acid (k).

The concentrated nitric acid (c) and (d), distilled off in the process, is set with approximately 65% nitric acid (e) and directed back to (b). The dilute nitric acid (f) is led back from 9 to 5. The phosphoric acid (k), if necessary after enrichment with further phosphoric acid (l) is directed back to 2.

The phosphoric acid carried off in the washing operations (h) and (j) can also be regenerated and used again, for example in (l).

What is claimed is:

1. In a process wherein anthraquinone is nitrated by reacting it with concentrated nitric acid, the improvement whereby the rate of reaction is reduced which comprises adding to the reaction mixture, after commencement of and during the nitration reaction, the nitrite ion in an amount sufficient to inhibit nitration, said nitrite ion being added in the form of $N_2O_3$ or in the form of a soluble nitrite.

2. The process of claim 1 wherein the nitration is carried out in the presence of water in an amount of from 3% to 10% of the reaction mixture.

3. The nitration process of claim 1, wherein the soluble nitrite is sodium nitrite.

4. The nitration process of claim 1, wherein the nitrite ion is added in amount of up to 10% (calculated as $N_2O_3$) by weight based on the weight of the concentrated nitric acid.

5. The nitration process of claim 1, wherein after completion of nitration, concentrated nitric acid is regenerated from the reaction mixture.

6. The nitration process of claim 5, wherein the source of the nitrite ion is more volatile than nitric acid, the reaction mixture being distilled to yield at least two fractions, a first fraction of nitric acid of high nitrite ion content and a second fraction consisting essentially of concentrated nitric acid.

7. The nitration process of claim 6, wherein the nitration process is carried out in continuous manner said second fraction being cycled to nitrate further starting material.

8. The nitration process of claim 7, wherein said first fraction is cycled to reduce the rate of reaction in the nitration of said further starting material.

9. The nitration process of claim 1, wherein anthraquinone is nitrated to 1-nitroanthraquinone.

10. The nitration process of claim 9, wherein the nitrite ion is added to the reaction mixture after 50% to 97% of the anthraquinone has been nitrated.

References Cited
FOREIGN PATENTS 2,103,360   8/1971   Germany _____ 260—369

LORRAINE A. WEINBERGER, Primary Examiner

E. J. SKELLY, Assistant Examiner